United States Patent
Bengtsson et al.

(10) Patent No.: US 11,750,264 B2
(45) Date of Patent: Sep. 5, 2023

(54) METHODS FOR BEAM CONTROL SIGNALING, RELATED NETWORK NODES AND WIRELESS DEVICES

(71) Applicant: Sony Group Corporation, Tokyo (JP)

(72) Inventors: Erik Bengtsson, Lund (SE); Olof Zander, Lund (SE); Fredrik Rusek, Eslöv (SE)

(73) Assignee: SONY GROUP CORPORATION, Tokyo (JP)

(*) Notice: Subject to any disclaimer, the term of this patent is extended or adjusted under 35 U.S.C. 154(b) by 50 days.

(21) Appl. No.: 17/435,021

(22) PCT Filed: Feb. 28, 2020

(86) PCT No.: PCT/SE2020/050224
§ 371 (c)(1),
(2) Date: Aug. 30, 2021

(87) PCT Pub. No.: WO2020/204778
PCT Pub. Date: Oct. 8, 2020

(65) Prior Publication Data
US 2022/0140883 A1 May 5, 2022

(30) Foreign Application Priority Data
Mar. 29, 2019 (SE) .................................. 1950394-5

(51) Int. Cl.
*H04B 7/06* (2006.01)
*H04B 7/08* (2006.01)
*H04B 7/0404* (2017.01)

(52) U.S. Cl.
CPC ......... *H04B 7/0695* (2013.01); *H04B 7/0691* (2013.01); *H04B 7/088* (2013.01); *H04B 7/0404* (2013.01)

(58) Field of Classification Search
CPC .... H04B 7/0695; H04B 7/0691; H04B 7/088; H04B 7/0404; H04B 7/0452;
(Continued)

(56) References Cited

U.S. PATENT DOCUMENTS

2018/0227094 A1   8/2018  Liu
2018/0367986 A1*  12/2018 Sundararajan ....... H04B 7/0404
(Continued)

FOREIGN PATENT DOCUMENTS

CN       108271175 A    7/2018
CN       108476050 A    8/2018
(Continued)

OTHER PUBLICATIONS

Swedish Office Action and Search Report from corresponding Swedish Application No. 1950394-5, dated Dec. 11, 2019, 8 pages.
(Continued)

*Primary Examiner* — Kenneth T Lam
(74) *Attorney, Agent, or Firm* — Tucker Ellis LLP

(57) ABSTRACT

The present disclosure provides a method, performed at a network node, for beam control signalling. The network node is configured to communicate with a wireless device comprising one or more physical antenna panels. Each physical antenna panel is configured to communicate with the network node using one or more panels. The method comprises receiving, from the wireless device, control signalling indicative of an association of the one or more panels with one or more corresponding physical antenna panels. The method comprises selecting, based on the association, one or more beams to be used by the wireless device in communication with the network node.

14 Claims, 6 Drawing Sheets

(58) Field of Classification Search
CPC .. H04B 7/0465; H04B 7/0469; H04B 7/0608; H04B 7/0817; H04B 7/0874; H04B 7/0408
See application file for complete search history.

(56) References Cited

U.S. PATENT DOCUMENTS

| | | | |
|---|---|---|---|
| 2019/0028167 A1 | 1/2019 | Chang | |
| 2019/0132851 A1* | 5/2019 | Davydov | H04L 5/0053 |
| 2019/0306850 A1* | 10/2019 | Zhang | H04L 5/0044 |
| 2020/0067590 A1* | 2/2020 | Wang | H04W 72/046 |
| 2021/0153215 A1* | 5/2021 | Guan | H04B 7/0691 |

FOREIGN PATENT DOCUMENTS

| | | |
|---|---|---|
| CN | 109275356 A | 1/2019 |
| CN | 109391296 A | 2/2019 |
| CN | 110537334 A | 12/2019 |
| WO | WO-2017192889 A1 | 11/2017 |
| WO | 2018009462 A1 | 1/2018 |
| WO | WO-2018175727 A1 | 9/2018 |
| WO | 2018183991 A1 | 10/2018 |
| WO | WO-2018231141 A1 | 12/2018 |
| WO | 2020037207 A1 | 2/2020 |

OTHER PUBLICATIONS

International Search Report and Written Opinion from corresponding International Application No. PCT/SE2020/050224, dated Sep. 30, 2020, 16 pages.
LC Electronics, "Updated feature lead summary of Enhancements on Multi-beam Operations," 3GPP TSG RAN WG1 Meeting #95, R1-1814122; dated Nov. 12-16, 2018, 26 pages.
Intel Corporation, "On Beam Management Enhancement," 3GPP TSG RAN WG1 Meeting #96, R1-1902503, Feb. 25-Mar. 1, 2019, 13 pages.
ZTE, "Enhancements on multi-beam operation," 3GPP TSG RAN WG1 Meeting #96, R1-1901635; dated Feb. 25-Mar. 1, 2019, 18 pages.
CATT, "Consideration on multi-beam operation enhancement," 3GPP TSG EAN WG1 #96bis, R1-1904562, dated Apr. 3-12, 2019, 8 pages.
Nokia et al: "Enhancements on Multi-beam Operation", 3GPP Draft; R1-1813490, 3rd Generation Partnership Project (3GPP), Mobile Competence Centre ; 650, Route Des Lucioles ; F-06921 Sophia-Antipolis Cedex ; France, Nov. 2, 2018 (Nov. 2, 2018), pp. 1-15, XP051479829.
VIVO: "Further discussion on Multi-Beam Operation", 3GPP Draft; R1-1901703_Further Discussion on Multi-Beam Operation, 3rd Generation Partnership Project (3GPP), Mobile Competence Centre ; 650, Route Des Lucioles; F-06921 Sophia-Antipolis Cedex ; FRAN, vol. RAN WG1, Athens, Greece; Feb. 25, 2019-Mar. 1, 2019 Feb. 16, 2019 (Feb. 16, 2019), XP051599399.

* cited by examiner

METHODS FOR BEAM CONTROL SIGNALING, RELATED NETWORK NODES AND WIRELESS DEVICES

The present disclosure pertains to the field of wireless communications. The present disclosure relates to methods for beam control signalling, related network nodes and wireless devices.

BACKGROUND

A wireless device may have a plurality of a physical antenna panels, e.g., one at its back, one in the front, and some at the sides. A physical antenna panel activated (even in idle) consumes power. There is a need for reducing the power consumption related to the physical antenna panels while still maintaining the radio performance of the wireless device.

SUMMARY

Accordingly, there is a need for devices and methods for beam control signalling, which address, mitigate, or alleviate the shortcomings existing and enable the wireless device to communicate to the network node an association between a panel and a corresponding physical antenna panel. This in turn permits the network node to select one or more beams to be used by the wireless device based on the association. The improved beam control signalling disclosed herein allows the wireless device to possibly deactivate one or more physical antenna panels, and thereby gives the possibility to reduce the power consumption at the wireless device.

The present disclosure provides a method, performed at a network node, for beam control signalling. The network node is configured to communicate with a wireless device. The wireless device comprises one or more physical antenna panels. Each physical antenna panel is configured to communicate with the network node using one or more panels. The method comprises receiving, from the wireless device, control signalling indicative of an association of the one or more panels with one or more corresponding physical antenna panels. The method comprises selecting, based on the association, one or more beams to be used by the wireless device in communication with the network node.

Further, a network node is provided, the network node comprising: a memory module, a processor module, and a wireless interface, wherein the network node is configured to perform any of the methods disclosed herein.

Advantageously, the present disclosure allows the network node to select one or more beams to be used by the wireless device based on the association indicating a physical antenna panel with which a panel is associated, and thereby enabling further power efficiency at the wireless device.

The present disclosure provides a method, performed at a wireless device, the wireless device comprising one or more physical antenna panels including a first physical antenna panel. The first physical antenna panel is configured to communicate, with a network node, using one or more panels including a first panel. The method comprises associating the first panel with the first physical antenna panel. The method comprises transmitting, to the network node, control signalling indicative of the association.

Further, a wireless device is provided, the wireless device comprising: a memory module, a processor module, and a wireless interface. The wireless device is configured to perform any of the methods disclosed herein.

It is an advantage of the present disclosure that the wireless device is capable of communicating to the network node an association between a panel and a corresponding physical antenna panel. The network node to select one or more beams to be used by the wireless device based on the association. The improved beam control signalling disclosed herein allows the wireless device to possibly deactivate physical antenna panel, and thereby reduces the power consumption at the wireless device.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1A:
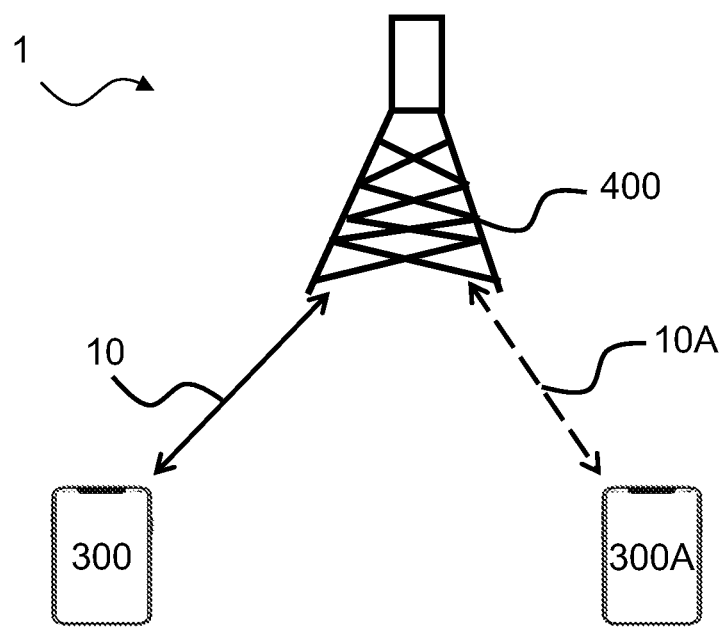
FIG. 1A is a diagram illustrating an exemplary wireless communication system comprising an exemplary network node and an exemplary wireless device according to this disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A wireless device may have a plurality of a physical antenna panels. A physical antenna panel activated (even in idle) consumes power, and it is therefore needed to reduce the power consumption while still maintaining the radio performance of the wireless device. A physical antenna panel comprises one or more panels (e.g. one or more antenna arrays, e.g. one or more antenna sub-arrays). For example, a physical antenna panel may be e.g. a module with multiple antenna arrays with different properties. A panel may be e.g. a single array of antennas. It is to be noted that the physical antenna panel disclosed herein refers to a hardware antenna module or a logic structure (e.g. logic element, and/or software module) associated with a hardware antenna module. In other words, a panel may be seen as a logical device that transmits one corresponding beam in one or more embodiments. In contrast, in one or more embodiments, the physical antenna panel may be seen a physical device that may transmit several beams. For example, the physical antenna panel as a physical device may have one single power supply/line. In other words, the panels belonging to one physical antenna panel typically share the same power line or power source and can therefore not be powered on/off independently on each other.

In 3$^{rd}$ Generation Partnership Project, 3GPP, the power consumption efficiency is addressed via the inclusion of a panel identifier (e.g. panel-IDs), e.g. a label marking the panel that transmitted a signal. However, the indication of the panel identifier may appear as if a panel is the same as a physical antenna panel. FIG. 1B illustrates example panels and example physical antenna panels. For example, the wireless device (e.g. user equipment, UE) may be manufactured with a physical antenna panel that is capable of transmitting K>1 beams simultaneously. However, the standardization may not allow the wireless device to report this configuration as one panel capable of transmitting K beams. The wireless device may report this configuration as K panels to the network node, all of which can simultaneously transmit a beam (e.g. a spatial Tx filter, port). The network node can select the UE beams so that the wireless device may switch off some of the K panels which are not active. However, this does not permit the wireless device to switch off the physical antenna panel since some of panels of the physical antenna panel are still active.

Accordingly, considering panel identifiers for beam selection is not sufficient to enable the network node in assisting the wireless device to switch off relevant physical antenna panel(s). It is to be noted that not much power is saved at the wireless device unless the entire physical antenna panel is switched off. It is to be noted that it may not be sufficient to transmit using less beams since the power supply to the physical antenna panel anyway needs to be activated when it enables the active beams transmitted by corresponding panels associated with the physical antenna panel. As long as the panel identifiers are not linked to any physical antenna panel at the wireless device, there is room for improving the power saving at the wireless device.

The present disclosure solves this by enabling the wireless device to indicate the association between the physical antenna panel and the panel. The disclosed network node may then select the UE beam based on the association, which allows the network node to improve the selection of the UE beams to minimize the number of necessary physical antenna panel active at the wireless device (by take into account the physical antenna panel in the UE beam selection) while still ensuring an advantageous performance of the beams selected. In other words, the number of physical antenna panels in the UE that have to be active are to be minimized according to one or more embodiments of this disclosure. The disclosed network nodes support the minimization by selecting beams that belong to the same physical antenna panels. The present disclosure proposes that the wireless device indicates to the network node the physical antenna panel(s) which allows the network node to identify which physical antenna panel(s) transmitting signals. The network node can then identify a set of physical antenna panels (e.g. the smallest possible set of physical antenna panels) from which there are signals of sufficient quality to meet performance criterion.

The figures are schematic and simplified for clarity, and they merely show details which are essential to the understanding of the invention, while other details have been left out. Throughout, the same reference numerals are used for identical or corresponding parts.

Figure 1B:
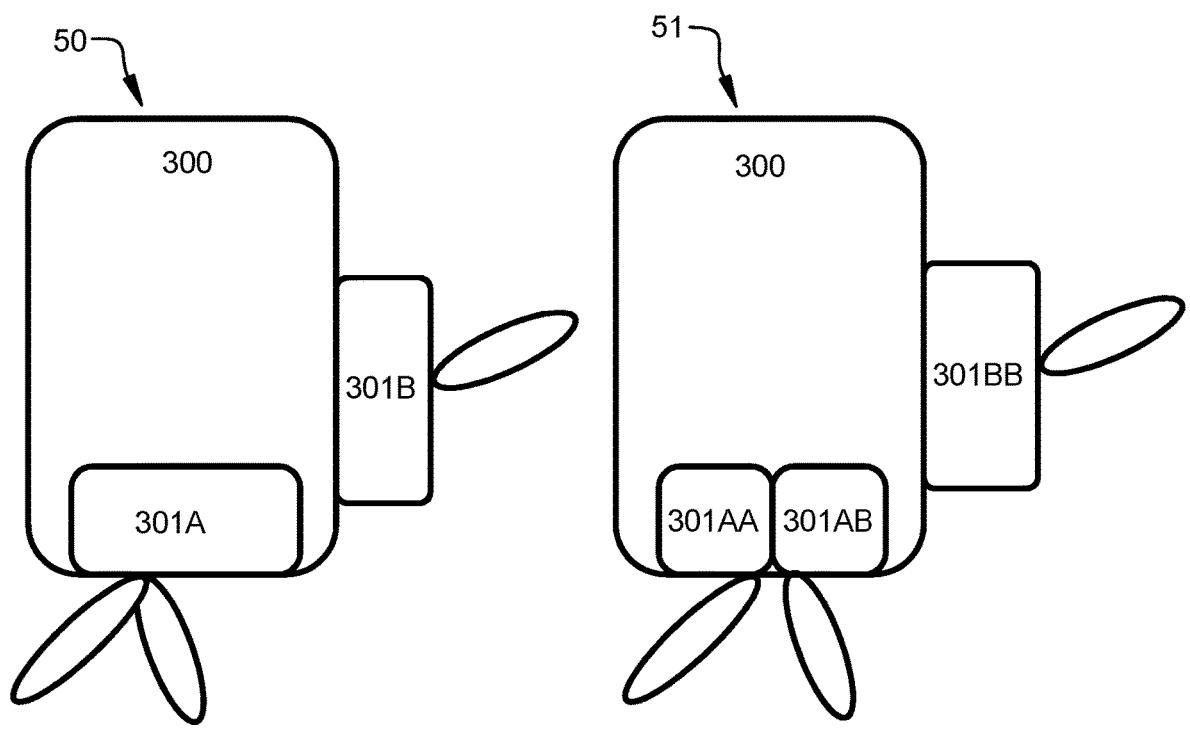
FIG. 1B is a diagram illustrating example physical antenna panels and example panels according to this disclosure.

FIG. 1A is a diagram illustrating an exemplary wireless communication system 1 comprising an exemplary network node 400 and an exemplary wireless device 300 according to this disclosure.

As discussed in detail herein, the present disclosure relates to a wireless communication system 1 comprising a cellular system, e.g. a 3GPP wireless communication system. The wireless communication system 1 comprises a wireless device 300 and/or a network node 400.

A network node disclosed herein refers to a radio access network node operating in the radio access network, such as a base station, an evolved Node B, eNB, gNB.

The wireless communication system 1 described herein may comprise one or more wireless devices 300, 300A, and/or one or more network nodes 400, such as one or more of: a base station, an eNB, a gNB and/or an access point.

A wireless device may refer to as a mobile device and/or a user equipment, UE.

The wireless device 300, 300A may be configured to communicate with the network node 400 via a wireless link (or radio access link) 10, 10A.

FIG. 1B is a diagram illustrating example physical antenna panels and example panels according to this disclosure.

Illustration 50 shows a wireless device 300 comprising a first physical antenna panel 301A and a second physical antenna panel 301B. The first physical antenna panel 301A is capable of transmitting two beams (e.g. two Tx spatial filters). The second physical antenna panel 301B is capable of transmitting one beam (e.g. one Tx spatial filter).

Illustration 51 shows the wireless device 300 wherein the first physical antenna panel 301A comprises a first panel 301AA and a second panel 301AB. In other words, the first panel 301AA and the second panel 301AB are associated with the first physical antenna panel 301A. The second physical antenna panel 301B comprises a panel 301BB. The panel 301BB is associated with the second physical antenna panel 301B.

The association disclosed herein may be reported to the network node by the wireless device 300 as the first panel 301AA associated with the first physical antenna panel 301A, the second antenna panel 301AB associated with the first physical antenna panel 301A, the panel 301BB associated with the second physical antenna panel 301B.

In an illustrative example, the network node observes that the beam strengths are (on a relative scale): 10, 8, 9, for panel 301AA, 301AB, and 301BB, respectively. For two spatial layers, without knowledge of the association of the panels to the physical antenna panels, this leads to a case where the network node selects beams corresponding to panels 301AA and 301BB which have superior strengths over panel 301AB. At the wireless device, this does not lead to any deactivation of any of the physical antenna panels because the first physical antenna panel 301A belongs to panel 301AA, and the first physical antenna panel 301A has to remain active and powered while the second physical antenna panel 301B belongs to panel 301BB and the second physical antenna panel 301B has to remain active and powered.

The present disclosure proposes to include signaling from the wireless device that reports the association of which panel (or panel identifier) belongs to the same physical antenna panel. This way, in the example of the three panels 301AA, 301AB, 301BB having beam strengths of: 10, 8, 9 respectively, the network node may select beams corresponding to panel 301AA and 301AB to enable a deactivation of the second physical antenna panel 301B at the wireless device.

It is to be noted that the physical antenna panel disclosed herein refers to a hardware antenna module or a logic structure (e.g. logic element, and/or software module) associated with a hardware antenna module.

The panel as disclosed herein may be a hardware element in one or more embodiments. The panel as disclosed herein may be a logic element (e.g. an abstract element, logic element, and/or software module) configured to transmit one beam at a time and to select one beam amongst a plurality of beams in one or more embodiments. In other words, a panel may be seen as a logical device that transmits one corresponding beam in one or more embodiments. In contrast the physical antenna panel may be seen a physical device that may transmit several beams. For example, the physical antenna panel as a physical device typically has one single power supply/line. In other words, the panels belonging to one physical antenna panel typically share the same power line or power source and can therefore not be powered on/off independently on each other.

Figure 2:
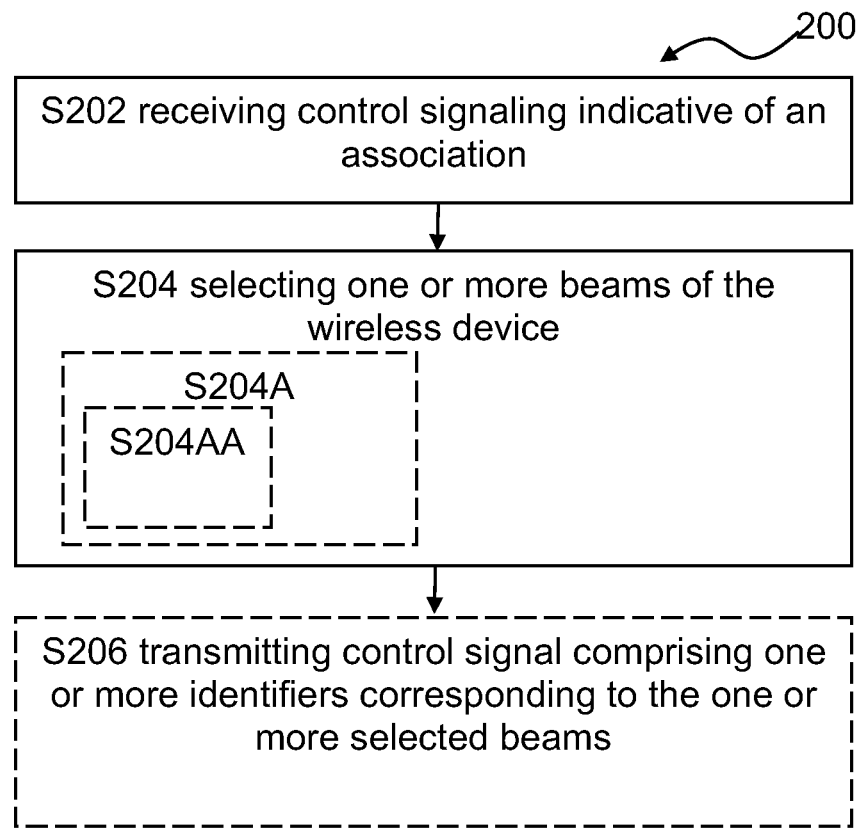
FIG. 2 is a flow-chart illustrating an exemplary method, performed at a network node, for beam control signalling according to this disclosure.

FIG. 2 shows a flow diagram of an exemplary method performed at a network node, according to the disclosure. The method 200 is performed at a network node, for beam control signalling.

The network node is configured to communicate with a wireless device. The wireless device comprises one or more physical antenna panels. Each physical antenna panel is configured to communicate with the network node using one or more panels.

The method 200 comprises receiving S202, from the wireless device, control signalling indicative of an association of the one or more panels with one or more corresponding physical antenna panels. The control signalling comprises one or more messages. For example, the network node may receive one or more signalling message indicative of an association of at least one panel with a corresponding physical antenna panel (e.g. a first panel with a first physical antenna panel). For example, for one or more panels, a panel identifier may be associated with a corresponding physical antenna panel (e.g. using a corresponding physical panel identifier). For example, the physical panel identifier may identify the association between the panel and the corresponding physical antenna panel. For example, the wireless device may communicate a list of labelled or associated panel identifiers. For example, panel identifiers sharing the same physical panel identifier (e.g. label or resource allocation) belong to the same physical panel identifier. In other words, the wireless device may indicate to the network node via the control signalling which panel identifiers are associated with the same physical antenna panel.

The method 200 comprises selecting S204, based on the association, one or more beams to be used by the wireless device in communication with the network node. The selection may be based on the physical antenna panel indicated in the association (e.g. using physical panel identifiers and/or labels). The one or more beams to be used by the wireless device may comprise one or more transmission beams of the wireless device and/or one or more reception beams of the wireless device. In one or more embodiments, the one or more beams to be used by the wireless device are one or more transmission beams of the wireless device This may advantageously allow the network node to assist the wireless device to power off power-consuming physical antenna panels. This is facilitated since the network node has control over which panels belong to the same physical antenna panel, and selects the beams to be used by the wireless device so that all panels of a physical antenna panel are to be inactive to enable a deactivation of the physical antenna panel, and thereby achieve a power-reducing effect.

In one or more example methods, selecting S204 the one or more beams comprises determining S204A the one or more beams based on beam quality indicators, a panel identifier and the association. For example, determining S204A the one or more beams may further be based on the need for the network node to serve other UEs (e.g. some of the good beams used by the network node with the UE of interest may be needed to serve other UEs). Beam quality indicators comprise beam strength and/or beam channel orthogonality (e.g. indicative of whether or not the beams can be independently received or not, e.g. when two beams are used, beam channel orthogonality indicated whether a Mx2 channel matrix is orthogonal where M refers to the number of beams used at the network node, which needs not to be 2). Selection of the one or more beams may permit maintaining performance required (QoS metric, data rate, cell throughput). In one or more example methods, determining S204A the one or more beams comprises minimizing S204AA a number of necessary physical antenna panels of the wireless device. This may permit achieving the least number of active physical antenna panels while maintaining performance required (QoS metric, data rate, cell throughput).

In one or more example methods, the method 200 comprises transmitting S206, to the wireless device, a control signal comprising one or more identifiers corresponding to the one or more selected beams. Identifiers may comprise beam identifiers.

In one or more example methods, the association is indicative of one or more hardware properties associated with the physical antenna panel. In one or more example methods, the one or more hardware properties comprise one or more of: a hardware layout and a power supply configuration.

Figure 3:
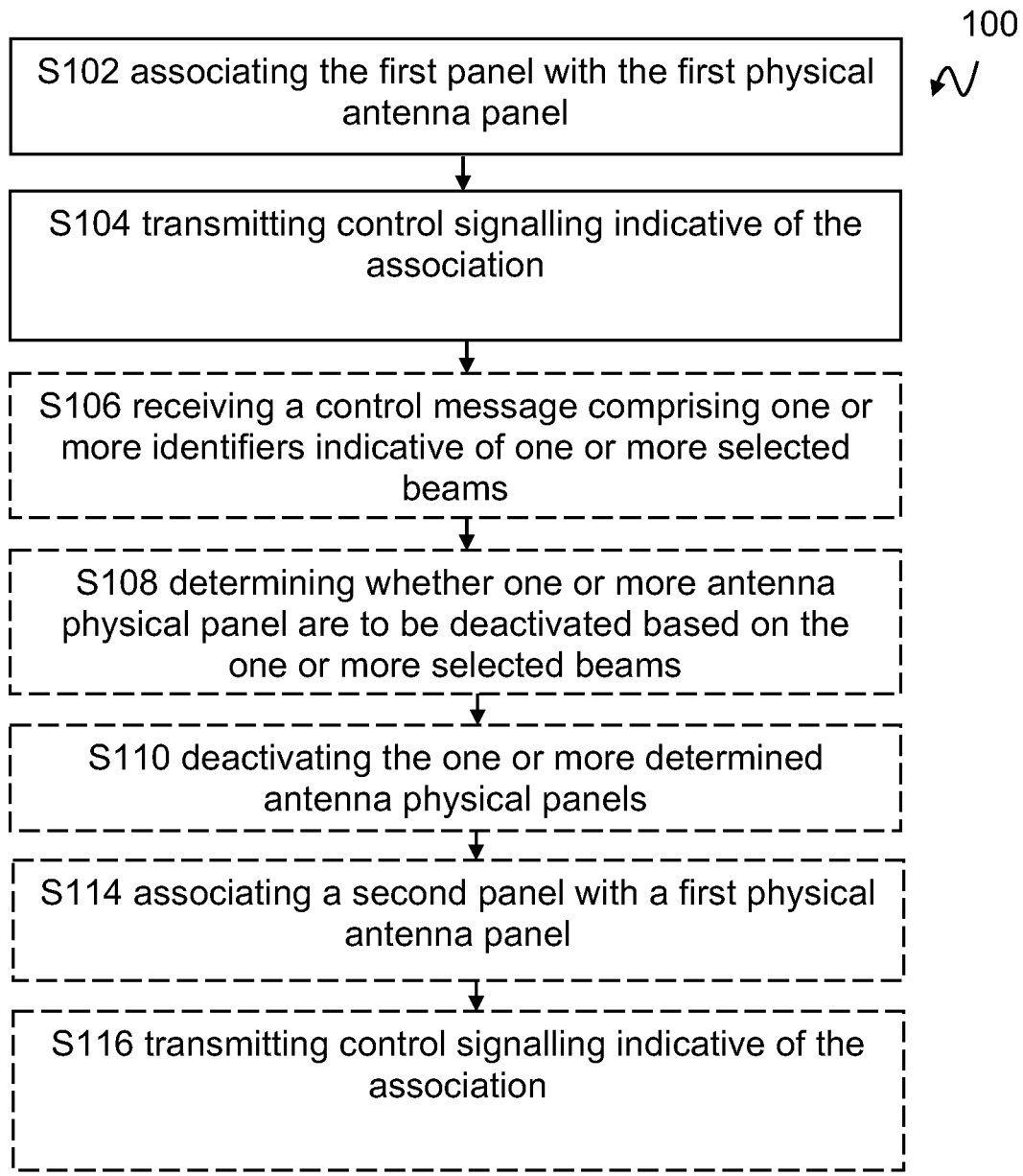
FIG. 3 is a flow-chart illustrating an exemplary method, performed at a wireless device of a wireless communication system according to this disclosure.

FIG. 3 shows a flow diagram of an exemplary method at a wireless device according to the disclosure. The method 100 is performed at a wireless device, the wireless device comprising one or more physical antenna panels including a first physical antenna panel. The first physical antenna panel is configured to communicate, with a network node, using one or more panels including a first panel.

The method 100 comprises associating S102 the first panel with the first physical antenna panel. For example, the wireless device may associate or assign a first panel identifier of the first panel with a first physical panel identifier of the first physical antenna panel. Associating means that the physical antenna panel where the panel is deployed is identified by the wireless device for communication with the network node. Associating may comprise assigning. In one or more example methods, the first panel identifier is configured to identify the first panel of the one or more panels of the first physical antenna panel. In one or more example methods, the first physical panel identifier is configured to identify the first physical antenna panel of the one or more physical antenna panels of the wireless device.

The method 100 comprises transmitting S104, to the network node, control signalling indicative of the association between the first panel and the first physical antenna panel. For example, control signalling or the association may comprise the first panel identifier associated with the first physical panel identifier. The transmission of the control signalling to the network node may be performed only once in e.g. a link establishment with the network node.

In one or more example methods, the method 100 comprises receiving S106, from the network node, control signalling comprising (or indicative of) one or more identifiers indicative of one or more selected beams to be used by the wireless device in communication with the network node.

In one or more example methods, the method 100 comprises determining S108 whether any physical antenna panel is to be deactivated based on the one or more selected beams; and upon determining that a physical antenna panel is to be deactivated, deactivating S110 the corresponding physical antenna panel. For example, when it is determined that a physical antenna panel is to be deactivated, the wireless device identifies which physical antenna panel is to be deactivated based on the de-selected one or more beams (which are remaining beam(s) determined based on the selected one or more beams), and the corresponding panel, and deactivate the corresponding physical antenna panel(s).

In one or more example methods, the association is indicative of one or more hardware properties associated with the first physical antenna panel. For example, the first physical panel identifier is indicative of one or more hardware properties associated with the first physical antenna panel. In one or more example methods, the one or more hardware properties comprise one or more of: a hardware layout and a power supply configuration.

In one or more example methods, the association may be indicative of one or more logical properties associated with the first panel and/or indicative of one or more hardware properties. In one or more example methods, the first panel identifier is indicative of one or more logical properties associated with the first panel and/or is indicative of one or more hardware properties.

In one or more example methods, the first physical antenna panel comprises a second panel. In one or more example methods, the method 100 comprises associating S114, the second panel with the first physical antenna panel. For example, a second panel identifier of the second panel may be associated with a first physical panel identifier. In one or more example methods, the method 100 comprises transmitting S116, to the network node, the control signalling indicative of the association.

Figure 4:
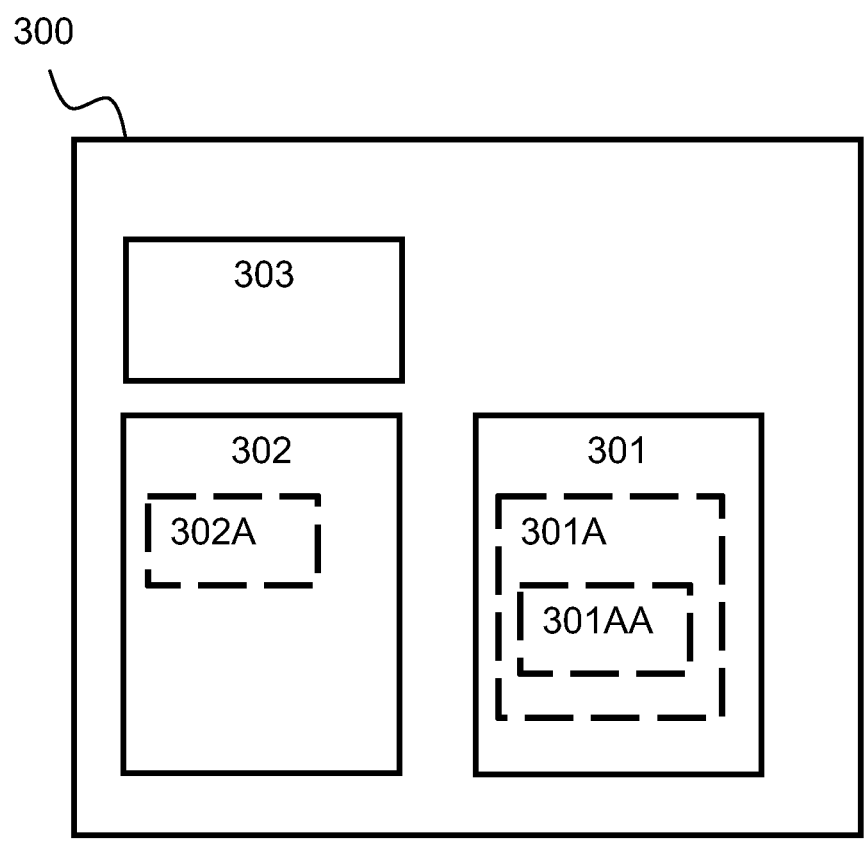
FIG. 4 is a block diagram illustrating an exemplary wireless device according to this disclosure.

FIG. 4 shows a block diagram of an exemplary wireless device 300 according to the disclosure. The wireless device 300 comprises a wireless interface 301, a processor module 302, and a memory module 303. The wireless device 300 may be configured to perform any of the methods disclosed in FIG. 3. The wireless device comprises one or more physical antenna panels including a first physical antenna panel 301A, wherein the first physical antenna panel 301A is configured to communicate, with a network node, using one or more panels including a first panel 301AA.

The wireless device 300 is configured to communicate with a network node, such as the network node disclosed herein, using a wireless communication system. The wireless interface 303 is configured for wireless communications via a wireless communication system, such as a 3GPP system.

The wireless device 300 is configured to associate (e.g. via an associator module 302A of the processor module 302) the first panel with the first physical antenna panel. For example, for the first panel, a first panel identifier is associated with a first physical panel identifier, and possibly stored in the memory module 303.

The wireless device 300 is configured to transmit, e.g. via the wireless interface 301, to the network node, control signalling indicative of the association (between the first panel and the first physical antenna panel).

The processor module 302 is optionally configured to perform any of the operations disclosed in FIG. 3 (e.g. S106, S108, S114, S116). The operations of the wireless device 300 may be embodied in the form of executable logic routines (e.g., lines of code, software programs, etc.) that are stored on a non-transitory computer readable medium (e.g., the memory module 303) and are executed by the processor module 302).

Furthermore, the operations of the wireless device 300 may be considered a method that the wireless module is configured to carry out. Also, while the described functions and operations may be implemented in software, such functionality may as well be carried out via dedicated hardware or firmware, or some combination of hardware, firmware and/or software.

The memory module 303 may be one or more of a buffer, a flash memory, a hard drive, a removable media, a volatile memory, a non-volatile memory, a random access memory (RAM), or other suitable device. In a typical arrangement, the memory module 303 may include a non-volatile memory for long term data storage and a volatile memory that functions as system memory for the processor module 303. The memory module 303 may exchange data with the processor module 302 over a data bus. Control lines and an address bus between the memory module 303 and the processor module 302 also may be present (not shown in FIG. 4). The memory module 303 is considered a non-transitory computer readable medium.

The memory module 303 may be configured to store the association in a part of the memory based on the received software data.

Figure 5:
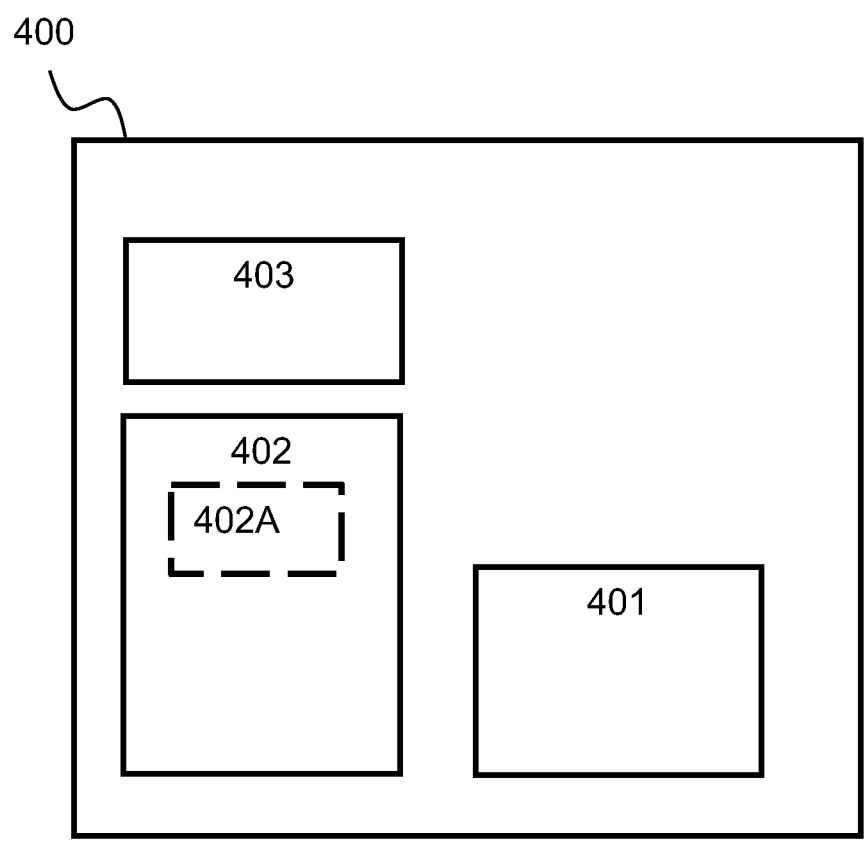
FIG. 5 is a block diagram illustrating an exemplary network node according to this disclosure.

FIG. 5 shows a block diagram of an exemplary network node 400 according to the disclosure. The network node 400 comprises a wireless interface 401, a processor module 402, and a memory module 403. The network node 400 may be configured to perform any of the methods disclosed in FIG. 2.

The network node 400 is configured to communicate with a network node, such as the network node disclosed herein, using a wireless communication system. The wireless interface 303 is configured for wireless communications via a wireless communication system, such as a 3GPP system.

The network node 400 is configured to receive, from the wireless device, via the wireless interface 401, control signalling indicative of an association of the one or more panels with one or more corresponding physical antenna panels.

The network node 400 is configured to select, (e.g. a selector module 402A of the processor module 402), based on the association, one or more beams to be used by the wireless device in communication with the network node.

The processor module 402 is optionally configured to perform any of the operations disclosed in FIG. 2 (e.g. S204A, S204AA, S206). The operations of the network node 400 may be embodied in the form of executable logic routines (e.g., lines of code, software programs, etc.) that are stored on a non-transitory computer readable medium (e.g., the memory module 403) and are executed by the processor module 402).

Furthermore, the operations of the network node 400 may be considered a method that the wireless module is configured to carry out. Also, while the described functions and operations may be implemented in software, such functionality may as well be carried out via dedicated hardware or firmware, or some combination of hardware, firmware and/or software.

The memory module 403 may be one or more of a buffer, a flash memory, a hard drive, a removable media, a volatile memory, a non-volatile memory, a random access memory (RAM), or other suitable device. In a typical arrangement, the memory module 403 may include a non-volatile memory for long term data storage and a volatile memory that functions as system memory for the processor module 403. The memory module 403 may exchange data with the processor module 402 over a data bus. Control lines and an address bus between the memory module 403 and the processor module 402 also may be present (not shown in FIG. 5). The memory module 403 is considered a non-transitory computer readable medium.

The memory module 403 may be configured to store the association in a part of the memory based on the received software data.

Embodiments of methods and products (network nodes and wireless devices) according to the disclosure are set out in the following items:

1. A method, performed at a network node, for beam control signalling, wherein the network node is configured to communicate with a wireless device, wherein the wireless device comprises one or more physical antenna panels, wherein each physical antenna panel is configured to communicate with the network node using one or more panels, the method comprising:

receiving (S202), from the wireless device, control signalling indicative of an association of the one or more panels with one or more corresponding physical antenna panels; and selecting (S204), based on the association, one or more beams to be used by the wireless device in communication with the network node.

2. The method according to item 1, wherein selecting (S204) the one or more beams to be used by the wireless device based on the association comprises determining (S204A) the one or more beams based on beam quality indicators, a panel identifier and the association.

3. The method according to any of items 1-2, the method comprising transmitting (S206), to the wireless device, a control signal comprising one or more identifiers corresponding to the one or more selected beams to be used by the wireless device.

4. The method according to any of items 2-3, wherein determining (S204A) the one or more beams based on the beam quality indicators, the panel identifier and the association comprises minimizing (S204AA) a number of necessary physical antenna panels of the wireless device.

5. The method according to any of items 1-4, wherein the association is indicative of one or more hardware properties associated with the physical antenna panel.

6. The method according to item 5, wherein the one or more hardware properties comprise one or more of: a hardware layout and a power supply configuration.

7. A method, performed at a wireless device, the wireless device comprising one or more physical antenna panel s including a first physical antenna panel, wherein the first physical antenna panel is configured to communicate, with a network node, using one or more panels including a first panel, the method comprising:

associating (S102) the first panel with the first physical antenna panel; and transmitting (S104), to the network node, control signalling indicative of the association between the first panel and the first physical antenna panel.

8. The method according to item 7, the method comprising:

receiving (S106), from the network node, control signalling comprising one or more identifiers indicative of one or more selected beams to be used by the wireless device in communication with the network node, determining (S108) whether any physical antenna panel is to be deactivated based on the one or more selected beams; and upon determining that a physical antenna panel is to be deactivated, deactivating (S110) the corresponding physical antenna panel.

9. The method according to any of items 7-8, wherein the association is indicative of one or more hardware properties associated with the first physical antenna panel.

10. The method according to item 9, wherein the one or more hardware properties comprise one or more of: a hardware layout and a power supply configuration.

11. The method according to any of items 7-10, wherein the association may be indicative of one or more logical properties associated with the first panel and/or indicative of one or more hardware properties associated with the first panel.

12. The method according to any of items 7-11, wherein the first physical antenna panel comprises a second panel; and wherein the method comprises:

associating (S114) the second panel with the first physical antenna panel; and transmitting (S116), to the network node, control signalling indicative of the association.

13. A wireless device comprising a memory module, a processor module, and a wireless interface, wherein the wireless device is configured to perform any of the methods according to any of items 7-12.

14. A network node comprising a memory module, a processor module, and a wireless interface, wherein the network node is configured to perform any of the methods according to any of items 1-6.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1A-5 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

The invention claimed is:

1. A method, performed at a network node, for beam control signaling, wherein the network node is configured to communicate with a wireless device, wherein the wireless device comprises one or more physical antenna panels, wherein each physical antenna panel is configured to communicate with the network node using one or more panels, the method comprising:
    receiving, from the wireless device, control signaling indicative of an association of the one or more panels that are activated or powered together with one or more corresponding physical antenna panels; and
    selecting, based on the association, one or more beams to be used by the wireless device in communication with the network node.

2. The method according to claim 1, wherein the selecting the one or more beams to be used by the wireless device based on the association comprises determining the one or more beams based on beam quality indicators, a panel identifier and the association.

3. The method according to claim 2, wherein the determining the one or more beams based on the beam quality indicators, the panel identifier and the association comprises minimizing a number of necessary physical antenna panels of the wireless device.

4. The method according to claim 1, further comprising transmitting, to the wireless device, a control signal comprising one or more identifiers corresponding to the one or more selected beams to be used by the wireless device.

5. The method according to claim 1, wherein the receiving the control signaling comprises receiving control signaling indicative of an association of one or more hardware properties associated with the one or more physical antenna panels.

6. The method according to claim 5, wherein the receiving the control signaling comprises receiving control signaling indicative of one or more of: a hardware layout and/or a power supply configuration of the one or more physical antenna panels.

7. A method, performed at a wireless device, the wireless device comprising one or more physical antenna panels including a first physical antenna panel, wherein the first physical antenna panel is configured to communicate, with a network node, using one or more panels, the method comprising:
    associating the first physical antenna panel with a first panel of the one or more panels that is activated or powered together with the first physical antenna panel; and
    transmitting, to the network node, control signaling indicative of the association between the first panel and the first physical antenna panel.

8. The method according to claim 7, further comprising:
    receiving, from the network node, control signaling comprising one or more identifiers indicative of one or more selected beams to be used by the wireless device in communication with the network node;
    determining whether any physical antenna panel is to be deactivated based on the one or more selected beams; and
    upon determining that a physical antenna panel is to be deactivated, deactivating the corresponding physical antenna panel.

9. The method according to claim 7, wherein the transmitting the control signaling comprises transmitting control signaling indicative of one or more hardware properties associated with the first physical antenna panel.

10. The method according to claim 9, wherein the transmitting the control signaling comprises transmitting control signaling indicative of one or more of: a hardware layout of the first physical antenna panel and/or a power supply configuration of the first physical antenna panel.

11. The method according to claim 7, wherein the transmitting the control signaling comprises transmitting control signaling indicative of one or more logical properties associated with the first panel and/or indicative of one or more hardware properties associated with the first panel.

12. The method according to claim 7, further comprising:
    associating the first physical antenna panel with a second panel of the one or more panels that is activated or powered together with the first physical antenna panel; and
    transmitting, to the network node, control signaling indicative of the association between the second panel and the first physical antenna panel.

13. A network node comprising:
a memory module;
a logic routine stored in the memory module;
a processor module;
and a wireless interface,
wherein the processor module is configured to execute the logic routine to:
 receive via the wireless interface control signaling from an associated wireless device comprising one or more physical antenna panels, wherein each physical antenna panel is configured to communicate with the network node using one or more panels, wherein the control signaling is indicative of an association of the one or more panels that are activated or powered together with one or more corresponding physical antenna panels; and
 select, based on the association, one or more beams to be used by the wireless device in communication with the network node.

14. A wireless device comprising:
a memory module;
a logic routine stored in the memory module;
a processor module; and
a wireless interface comprising one or more physical antenna panels including a first physical antenna panel configured to communicate with an associated network node using one or more panels,
wherein the processor module is configured to execute the logic routine to:
 associate the first physical antenna panel with a first panel of the one or more panels that is activated or powered together with the first physical antenna panel; and
 transmit to the associated network node via the wireless interface control signaling indicative of the association between the first panel and the first physical antenna panel.

* * * * *